United States Patent [19]
Mignon

[11] 3,911,225
[45] Oct. 7, 1975

[54] METHOD AND DEVICE FOR CHECKING AND ADJUSTING A PCM TRANSMISSION DEVICE

[75] Inventor: Guy Mignon, Argenteuil, France

[73] Assignee: Compagnie Industrielle des Telecommunications Cit-Alcatel, France

[22] Filed: Feb. 27, 1974

[21] Appl. No.: 446,338

[30] Foreign Application Priority Data

Feb. 27, 1973 France .............................. 73.06951

[52] U.S. Cl. .......................... 179/15 BF; 307/235 A
[51] Int. Cl.$^2$ .............................................. H04J 3/14
[58] Field of Search ................. 179/15 BF, 175.1 A; 307/235 A; 325/133

[56] References Cited

UNITED STATES PATENTS

| | | | |
|---|---|---|---|
| 3,683,115 | 8/1972 | Schellenberg | 179/15 BF |
| 3,787,628 | 1/1974 | Van Dijk | 179/15 BF |
| 3,796,834 | 3/1974 | Kuhar | 179/15 BF |
| 3,798,635 | 3/1974 | Candiani | 179/15 BF |

*Primary Examiner*—David L. Stewart
*Attorney, Agent, or Firm*—Craig & Antonelli

[57] ABSTRACT

A method and device for checking and adjusting a PCM transmission system in which a plurality of sampled information signals are binary coded in the form of pulse trains with a first pulse identifying the polarity of a respective information signal sample and the remaining pulses defining predetermined quantification levels of the sample, wherein detection of the maximum quantification levels corresponding to maximum code values are effected, and comparison of the detected maximum quantification levels during distinct prescribed time intervals is effected respectively with a first prescribed number of maximum code values and a second prescribed number of maximum code values to determine the correctness of the adjustment.

11 Claims, 1 Drawing Figure

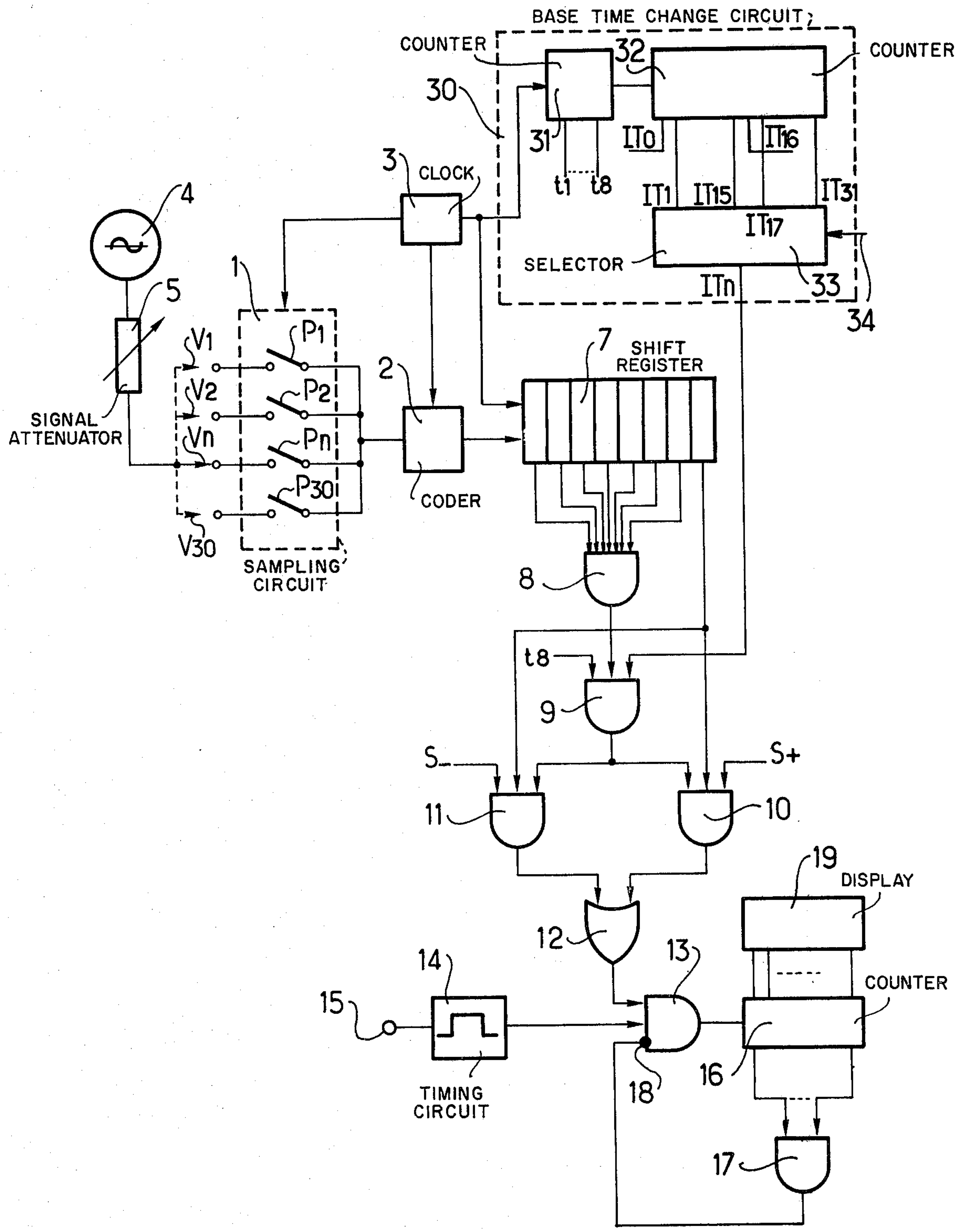
BASE TIME CHANGE CIRCUIT
COUNTER
COUNTER
CLOCK
SELECTOR
SHIFT REGISTER
SIGNAL ATTENUATOR
CODER
SAMPLING CIRCUIT
DISPLAY
COUNTER
TIMING CIRCUIT

METHOD AND DEVICE FOR CHECKING AND ADJUSTING A PCM TRANSMISSION DEVICE

The present invention comes within the branch of multiple-channel transmission systems in which the channel signals are transmitted in the form of binary-coded samples, these samples being drawn off one after another, respectively, on the various channel signals during elementary intervals of time succeeding one another in a determined repetitive time, called a frame.

The present invention concerns more particularly devices for controlling the adjustments of the transmission equipment of such a channel signal transmission system, more particularly, of a PCM system equipment for telephonic networks.

It is known that in the PCM system, the samples of the signals on a set of 30 channels are transmitted by the sampling of each channel signal at a frequency at least equal to twice the highest frequency contained in the signals (this being a frequency of 8000 c/s) and by multiplexing in time samples drawn off on the set of channel signals. In a frame comprising 30 samples drawn off respectively on the 30 channel signals during 30 successive intervals of time, the channel signal samples are situated at determined positions in time in the frame. The amplitude of each of the samples drawn off is then coded in digital form by means of a code containing seven binary elements representing 128 distinct quantification levels on a half-wave, of a channel signal, an eighth binary element being connected, foremost, with that code, to define the positive or negative polarity of the respective samples.

It should be observed that, in such a transmission system, each frame comprises, moreover, a locking data item and a signaling data item, each having eight bits and transmitted during an interval of time equal to that of each sample. Thus, a frame is formed by 32 intervals of time designated hereinafter as IT, to which an ordinal index has been assigned.

It must be understood that the sampling of the channel signals is controlled by a time base ensuring also their multiplexing in time and the synchronizing of the 8-bit coding effected during each interval of time IT. The binary coding of the amplitude of the successive samples drawn off on the channel signals is effected in an analog-digital chain by comparison of the value of each sample with signals having predetermined values defining the coding scale. In that analog-digital chain, the channel signal samples will be transmitted to a comparator, through pre-set analog amplifiers, receiving, moreover, reference signals having predetermined values sent out by outside generators (for example, current generators). These generators will be chosen two by two having the same characteristics with a view to sending out opposite reference signals two by two to enable a symmetric coding of the positive and negative samples. The analog amplifiers are originally set for transmitting signals whose maximum defined value corresponds to the maximum amplitude samples; the coder is also pre-set so that a maximum amplitude sample may correspond to its full coding capacity. In practice, it is observed, however, that such an analog-digital chain may lead to coding errors due, more particularly, to a slight disparity between the generators sending out the reference signals opposite in pairs. These errors are also due to the analog amplifiers connected up in the chain, which may alter the signals because of the distortion, the zero offset and the possible peak-limiting which they effect on these signals. It is, therefore, consequently necessary to check the adjusting of such a channel signal transmission equipment. A known manner for checking the adjustment of the transmission equipment of a PCM system consists in observing, on an oscilloscope, the pulse codes sent out which correspond to a channel sample having maximum amplitude and in deducing that its adjustment is correct when a flickering effect is obtained on the pulse having the least coding weight. That flickering phenomenon indicates that the coder is then used practically at full capacity and that the maximum amplitude of the channel signal which it receives is very close to the maximum level of the preadjustment signal; that flickering is significant of the correct adjustment of the coder.

It is evident that the controlling of the exactitude of the coder connected up in the transmission equipment, based on the observing of that flickering, is not very precise at all.

The aim of the present invention is to enable a strict checking of the correct adjustment of a PCM transmission equipment.

The present invention has for its object a method for checking the adjustment of a PCM transmission equipment in which the signals of a set of channels are sampled in time and transmitted, by binary coding of the amplitude of the respective samples, in the form of pulse trains in each of which the foremost pulse is assigned to the polarity of the samples, the coding of the successive samples being controlled by a time base and effected during successive time intervals defining, for the channel signals as a whole, a frame containing in series the codes of the samples of the signals of all the channels, the method being characterized in that it consists in:

detecting the full coding capacities corresponding to the polarity defined samples drawn off on a selected channel signal and in effecting the counting during a determined period of time called measuring time interval;

and in detecting a variation between a first minimum number and a second zero number in the full coding capacities counted respectively during first and second measuring time intervals, for a maximum variation of one decibel of the level of the said selected channel signal in relation to the nominal input level of the channel.

The present invention also has for its object the device for implementing that method, that device being characterized in that it comprises:

a low frequency signal generator, having a defined level and frequency, connected up to the input of a selected channel through a means for adjusting the level of the said signal;

a decoder for full coding capacities, connected up to the output of the coder, comprising a shift register synchronized at the frequency of the coding pulses and a logic AND circuit connected up to the outputs of the shift register and controlled by a first signal which is a time signal for which the coding pulses for the samples coming from the said selected channel are simultaneously contained in the said shift register and by a second signal which is a polarity selecting signal for the sample;

and a counter having a predetermined maximum capacity, chosen equal to the said minimum number of full capacities counted during the said first measuring time connected up to the output of the said logic circuit through a control circuit servo-controlled by a counting time signal equal to the said measuring time and inhibited by a detection signal for the full capacity of the counter.

Other characteristics and advantages of the present invention will become apparent from the description of an embodiment given by way of an example and shown in the single FIGURE of the accompanying drawing.

That FIGURE shows at 1 a sampling circuit, symbolically shown by gates P1 to P30, transmitting to a coder 2 samples drawn off from channel signals V1 to V30 which it receives. That sampling circuit 1 and the coder 2 are controlled by a time base 3 comprising more particularly, a clock sending out pulses having a frequency of 2.048 Mc/s, from which are developed eight successive repetitive elementary instants at a frequency of 256 kc/s controlling the coder 2, these eight elementary instants being used subsequently for developing 32 intervals of time constituting a repetitive frame at a frequency of 8 kc/s controlling the opening of the gates P1 to P30 of the sampling circuit 1. Two intervals of these 32 intervals of time are arranged, according to the practice in such a system, for the insertion, starting from the auxiliary element, of synchronizing and signaling data items in the frame thus constituted, these data items constituting, at defined intervals of time, characteristic binary words. That auxiliary element is not shown separately in the figure; here, it is considered as forming a part of the coder at whose output is sent out the whole of the signals transmitted in the form of code pulses. The sampling circuit 1, the coder 2 and the time base 3 are known PCM equipment for a set of 30 telephone channels; consequently, they are not described in greater detail hereinafter. It is simply necessary to observe that the coder is constituted by a comparator combined on the one hand with analog amplifiers, transmitting the samples drawn off on the channel signals and, on the other hand, with outside generators transmitting necessary reference signals for the coding of these samples. That coder 2 is originally adjusted so as to make a defined level in the coding scale correspond to a defined input signal simulating a channel signal. The coder 2 must send out, in a frame formed by 32 time intervals developed by the time base, a sequence of pulses corresponding to the 8-bits coding of each of the 30 successive samples of the channel signals, the foremost bit of each coded sample being assigned to the polarity of the sample. The PCM transmission equipment adjustment control device thus constituted comprises a sinusoidal voltage generator 4, having a low frequency, for example, 820 c/s, and a defined level, connected up through an adjustable attenuation line 5 at the input of one of the channels, V*n*, selected by the transmission equipment. The generator 4 and the attenuating line 5 make it possible to simulate a channel signal on the selected channel V*n*. The control device comprises, moreover, a shift register 7 whose input is connected up to the output of the coder 2; that shift register has eight stages so as to contain each coded sample, the advance of the pulses received from the coder is controlled at the rhythm of the pulses coming from the coder (2.048 Mc/s), that is, by the clock of the time base 3. The outputs of the first seven stages of the shift register 7, counted from the input of the register, are combined together in an AND gate 8 for full coding capacities. A new time base 30, developed from the clock at 2.048 Mc/s of the time base 3 controls the decoding of full capacities.

That new time base 30 comprises a counter having a capacity cycle of 8, designated at 31, receiving, from the time base 3, the clock pulses at 2.048 Mc/s and a counter having a capacity cycle of 32, designated at 32, arranged after the counter 31. The counter 31 sends out eight elementary instants designated *t*1 to *t*8; the counter 32 sends out 32 time intervals designated IT0 to IT31, forming a frame for controlling the decoding of full capacities. They comprise, moreover, a selecting element 33 for selecting one of the IT's sent out by the counter 32 corresponding to the selected channel. That selecting element 33 is connected up to the outputs of the counter 32, exclusive of the two outputs on which are sent out respectively the IT0 and IT16 corresponding to the two time intervals of the frame which contain the synchronizing and signaling data items. An external control signal at 34 applied to the element 33 enables the selecting of the IT whose order is n sent out by the IT1 to IT15 and IT17 to IT31, which correspond to the selected channel V*n*.

That new time base 30 ensures the controlling of a logic circuit having AND gates ensuring the detecting of the full coding capacities corresponding to the channel signal V*n* having a selected polarity. The output of the AND gate 8 is connected up to an AND gate 9 intended for the selecting of an interval of time of the successive control frames, that is, IT*n*, corresponding to the sampling of the channel signal V*n*; the AND gate 9 comprises, therefore, a second input on which is applied the control signal ITn obtained by the selecting of an output of the counter 32. The AND gate 9 comprises, moreover, a third input controlled during the presence of the code of a same sample in the register 7; that period corresponds to the elementary instant *t*8 sent out by the counter 31 for which the first bit of the sample (sign bit) is in the last stage of the shift register 7.

The output of the AND gate 9 is connected up to a first input of two AND gates 10 and 11 ensuring the selection of the polarity of the samples drawn off from the channel signal V*n*. On a second input, of the AND gate 10, an external signal S+ is applied for ensuring the controlling of the AND gate 10 when there is a positive sample in the register 7; a third input of that AND gate 10 is connected up to the output of the last stage of that register 7. A signal S− is applied to a second input of the AND gate 11; its third input is connected up to the output of the last stage of the shift register 7. That AND gate 11 ensures the selecting of the negative samples drawn off during IT*n*. An OR gate 12 connects up the outputs of the two AND gates 10 and 11 to an input of an AND gate 13; that AND gate 13 ensures the controlling of the duration of the measuring effected so as to enable the checking of the adjustment of the transmission equipment. The AND gate 13 receives a measuring time signal of one second, for example, sent out by a monostable element 14 receiving an external signal for the start of the controlling applied to 15. The output of the AND gate 13 is connected up to a digital counter 16 having a predetermined maximum counting capacity, here chosen, to great advantage, as being equal to 99 for a control lasting one second. The AND gate 13 comprises a third inhibiting input 18 connected up to an AND gate 17 for maximum decoding capacity of the counter 16. That inhibiting input 18 blocks the state of the counter 16 at its maximum capacity when the latter is reached during the 1 second measuring time. A display element 19 displays the state of the counter 16.

In this device, when there is a maximum code ± 1111111 corresponding to a sample coming from the selected channel in the shift register 7, the AND gate 8 is conductive and sends out a signal at its output. The AND gate 9 sends out a maximum code decoding data item.

In the case where it is required to effect measuring on samples of positive polarity, the AND gate 10 is made conductive for any maximum code data item transmitted at the output of the AND gate 9 having, moreover, foremost, a bit having a positive sign. In that case, the maximum positive code data causes the advancing of the state of the counter 16 by one unit. The maximum capacity of the counter 16 being reached before the end of the 1 second measuring time, the state of the counter is blocked at its maximum capacity without taking into account extra positive maximum code decoding data items. The end of the 1 second measuring time also blocks the advancing of the counter 16.

In the case where it is required to effect the checking of the adjusting of the coder for negative samples, the AND gate 11 will receive a signal S− making it conductive for any maximum code detected accompanied by a bit having a negative sign. The counting of the data items resulting therefrom will be effected as previously in the counter 16 during the 1 second measuring time.

The adjustment checking of the PCM transmission equipment by that counting device for detected full coding capacities is effected by two measuring operations, each lasting the same time (1 sec.), on the signal applied to the selected channel $Vn$, the level of that input signal having, between the two measurements, undergone a maximum variation of 1 dB.

The first measuring operation is effected for a level of the signal applied to the channel $Vn$ equal to the nominal level of the channel signal which it simulates. The number of detected full coding capacities is given to the display element 19 by the counter 16, having two digits, that is, whose counting capacity is limited to 99; the second measuring operation is effected for a level of the signal applied to the channel $Vn$ decreased by 1dB per corresponding adjustment of the attenuation line 5. The new number of detected full coding capacities is also given by the counter 16 and its display element 19.

From these two measurements, it is deduced that the adjusting of the PCM transmission equipment is correct for a counting of 99 detected full coding capacities during the first measuring operation, whereas during the second measuring operation the state of the counter 16 remains at zero.

For that same variation in the level of the input of the signal applied to the selected channel $Vn$, a checking of the same counted full coding capacity variations may be effected for the samples of reverse polarity.

It must be understood that a comparison circuit for these two states assumed by the counter 16 may be connected with that counter to send out directly the correct or defective adjusting data for the equipment. Such a circuit, which may easily be understood by the man in the art, has not been included in the example of embodiment illustrated; it is evident that it in no way modifies the scope of this invention. Likewise, without going beyond the scope of this invention, it is evident that in the embodiment shown, any one of the means shown may be replaced by other technically equivalent means.

What is claimed is:

1. A method for checking the adjustment of a PCM transmission system in which each respective signal of a set of signal channels is sampled in time and transmitted, by binary coding the amplitudes of the respective signals in the form of pulse trains, in each of which the first pulse identifies the polarity of the respective sample and the remaining pulses define a predetermined quantification level of the sampled channel signal, the coding of successive samples effected during successive time intervals defining, for each set of channel signals, a frame containing a series of codes of the samples of the signals of each channel, said method comprising the steps of:

detecting the codes corresponding to the maximum quantification level, such codes being known as full coding capacities, of prescribed polarity samples of a selected channel signal and counting the number of detected full coding capacities over prescribed measuring time intervals;

detecting the variation between a first number of detected full coding capacities and a first prescribed number of full coding capacities during a first measuring time interval for a nominal input signal level of said selected channel signal;

detecting the variation between a second number of detected full coding capacities and a second prescribed number of full coding capacities during a second measuring time interval for a maximum variation of one decibel in the level of said selected channel signal with respect to the nominal input level of said channel; and effecting the correct adjustment of said PCM transmission system so that said first number is at least equal to said first prescribed number and said second number is at most equal to said second prescribed number.

2. A method according to claim 1, wherein said second prescribed number is zero.

3. In a PCM transmission system in which a plurality of information signals are sampled at a first prescribed frequency and the amplitudes of which are coded into respective binary coded signals in the form of pulse trains making up respective channel signals, the first pulse in each train identifying the polarity of a respective information signal sample, with the coding of successive samples effected during successive time intervals defining, for each set of channel signals, a frame containing a series of codes of the respective samples of the information signals in each channel, an apparatus for checking the adjustment of said system comprising:

first means, responsive to the contents of the pulse train into which a selected channel signal of a prescribed polarity has been coded during each frame, for detecting each occurrence of the maximum code value permitted in said pulse train and generating a first signal indicative thereof; and second means, coupled to said first means, for counting the number of said pulse trains having said maximum value during a prescribed time interval.

4. An apparatus according to claim 3, wherein said first means comprises a first register, having a selected number of bit positions corresponding to the number of bit positions in each of said pulse trains, including binary positions into which the amplitudes of said samples are coded and a polarity position corresponding to the polarity of the coded sample, and a first logic circuit, coupled to the output of said first register, for providing said first signal in response to said first register being loaded to its full capacity corresponding to said maximum value.

5. An apparatus according to claim 3, wherein said second means comprises a first counter, a first gate circuit coupled to the input thereof, and a first timing circuit for supplying, to an input of said first gate circuit, an enabling signal for said prescribed time interval, the output of said first means being coupled to another input of said first gate circuit.

6. An apparatus according to claim 4, wherein said second means comprises a first counter, a first gate circuit coupled to the input thereof, and a first timing circuit for supplying, to an input of said first gate circuit, an enabling signal for said prescribed time interval, the output of said first logic circuit being coupled to another input of said first gate circuit.

7. An apparatus according to claim 6, wherein said apparatus further comprises a frequency signal generator producing a signal having a prescribed amplitude and frequency, means for adjusting the amplitude of the signal produced by said frequency generator, means for sampling said signal at a selected sampling frequency, and a coder circuit, coupled between said sampling means and said first register, for coding said sampled signals into said pulse trains and supplying said pulse trains to said first register.

8. An apparatus according to claim 7, further comprising means for generating respective first timing signals for controlling the rate at which said samples are connected into said pulse trains, and second timing signals for controlling the rate at which said information signals are sampled into the respective signal channels.

9. An apparatus according to claim 8, wherein each first timing signal contains a plurality of pulses corresponding to the bit positions of said first register, and wherein said timing signal generating means further comprises means for selecting one of said second timing signals corresponding to said selected channel signal to be supplied to said first logic circuit.

10. An apparatus according to claim 9, wherein said first logic circuit comprises a first AND gate having a plurality of inputs respectively coupled to outputs of the individual bit stages of said first register, a second AND gate connected to receive one of the pulses of said first timing signals, the output of said first AND gate, and said selected one of said second timing signals, third and fourth AND gates each being connected to the output of said second AND gate and to that stage of said first register corresponding to the pulse bit position of the polarity of a signal sample, and wherein said third and fourth AND gates further respectively receive polarity identify signals of the signal sample, and an OR gate coupling the outputs of said third and fourth AND gates to said first gate circuit.

11. An apparatus according to claim 10, wherein said second means further includes a fifth AND gate receiving the outputs of the respective stages of said first counter and being coupled through an inverter line to said first gate circuit.

* * * * *